Dec. 16, 1969  B. N. WILSON  3,483,871
SUNTANNING DEVICE

Filed May 20, 1966  5 Sheets-Sheet 1

INVENTOR.
BILLY N. WILSON
BY
Barnes, Kisselle, Raisch & Choate
ATTORNEYS

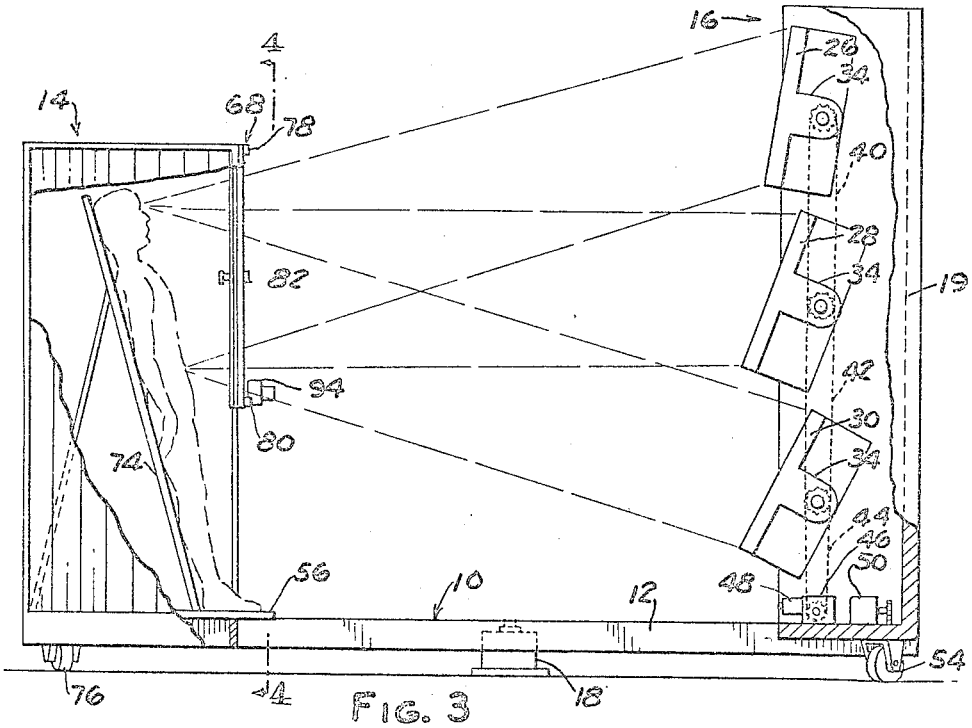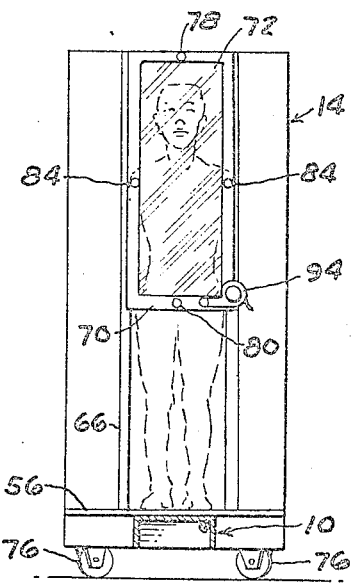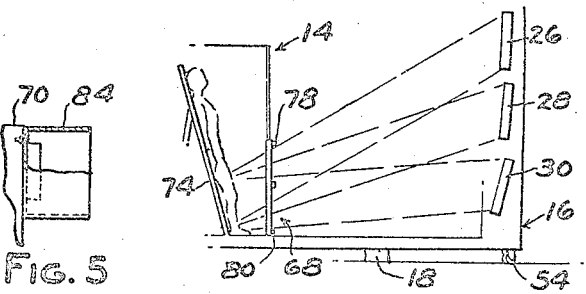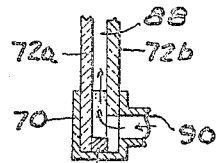

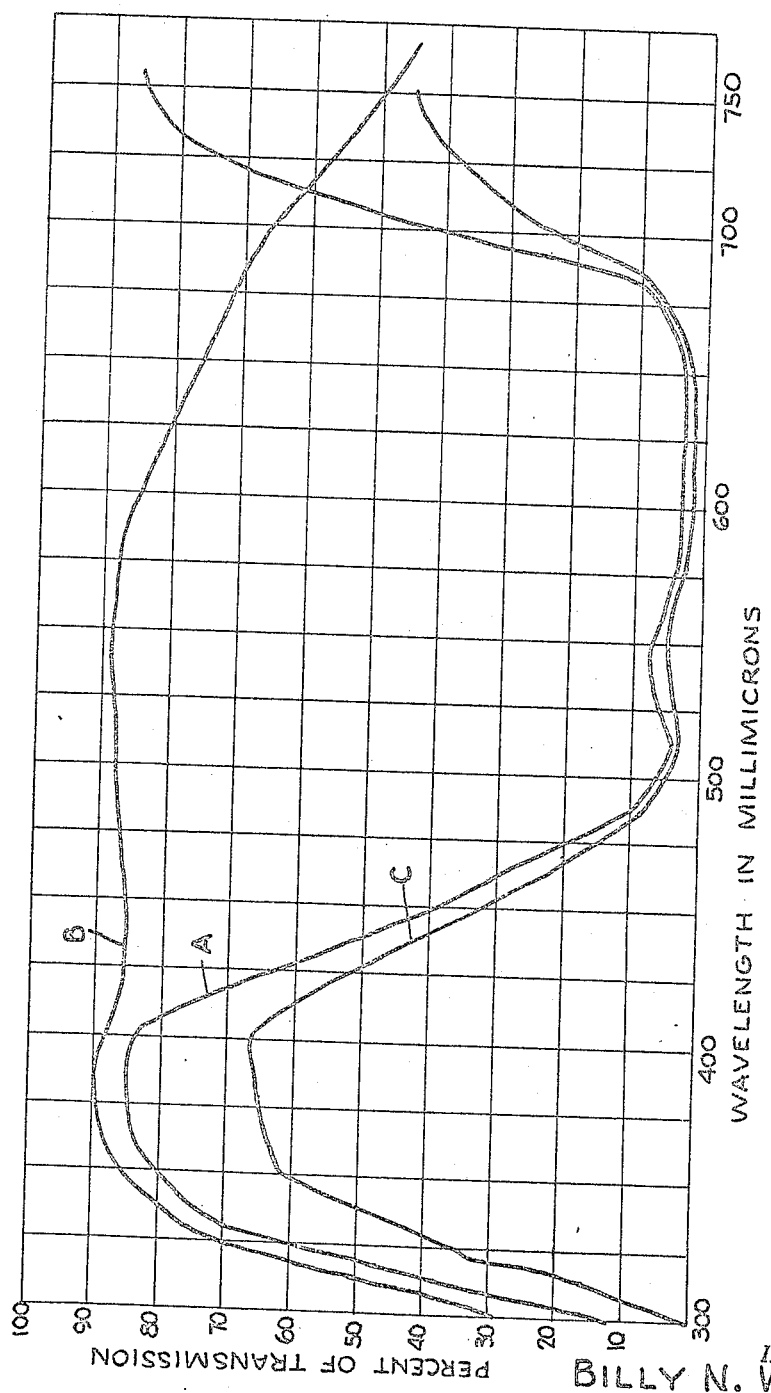

United States Patent Office 3,483,871
Patented Dec. 16, 1969

3,483,871
SUNTANNING DEVICE
Billy N. Wilson, 9596 Carlin Ave.,
Detroit, Mich. 48227
Filed May 20, 1966, Ser. No. 551,673
Int. Cl. A61h 33/00; A61n 5/06
U.S. Cl. 128—372      4 Claims

ABSTRACT OF THE DISCLOSURE

A suntanning device in the form of a rotatable support having thereon an enclosure in which a person is adapted to stand and a reflector spaced from the enclosure. The enclosure has an opening in the side thereof facing the reflector in which a filter panel is arranged for receiving the condensed beam of light from the reflector. The filter is of a type which transmits a high percentage of light energy having a wave length in the suntanning range and absorbs a high percentage of light energy having a wave length in the sunburning range. The main support is rotatable in a horizontal plane and the reflectors are adjustable. Photocells are arranged around the filter and adapted when energized by the light beam reflected by the reflectors to rotate the main support and to adjust the reflectors so that the sun's rays will be reflected through the filter onto a person in the enclosure.

---

This invention relates to a suntanning device.

A common problem encountered by many persons in connection with obtaining a tan through solar radiation is the susceptibility to produce sunburning prior to or concurrent with the obtaining of a suntan. This problem varies in degree with different types of persons depending on the nature of their skin and their susceptibility to sunburning; and in some cases this problem becomes acute where prolonged exposure to strong solar radiation occurs. It is generally understood that a tanning effect on the skin is obtained through the production and oxidation of certain pigments within the layers of skin. It has been determined, through medical research and otherwise, that sunburning is most apt to occur with most persons as a result of exposure to solar radiation having a wave length of about 290 to 310 millimicrons. Some suntanning also results from exposure to radiation within this range of wave lengths. It has been shown that tanning of the skin without sunburning is produced with most persons by exposure to wave lengths of about 320 to 440 millimicrons. Some studies indicate that the most effective radiation for producing a suntan without burning has a wave length of about 390 millimicrons. Accordingly, with most persons maximum suntanning with a minimum of sunburning is obtained by exposing the skin to radiation having a wave length of about 320 to 440 millimicrons while eliminating substantially all exposure to radiation having a wave length of less than about 310 millimicrons.

While filters and combinations of filters are available which will absorb a high percentage of solar radiation having a wave length below 310 and above 440 millimicrons, the use of such filters alone for producing a suntan would require an unduly long exposure to sun light.

It is an object of the present invention to provide a device by means of which the suntanning effect of solar radiation can be appreciably accelerated while the susceptibility to sunburning is reduced to a minimum.

More specifically, it is an object of the present invention to provide a device incorporating means, such as one or more reflectors, for receiving solar radiation and concentrating such radiation into a condensed beam of high intensity sun light and then directing the beam through a filter arrangement which is adapted to absorb a high percentage of the radiant energy having a wave length which would normally produce sunburning and which also absorbs a high percentage of the radiant energy which normally would produce heat.

A further object of the invention resides in the provision of a suntanning device that is constructed as a support on which reflectors and a filter are mounted and on which a person is adapted to recline, the support as a whole being rotatable and the reflectors being adjustable so that a person is able to obtain a suntan during most any time of the day when the sun is shining.

Another object of the invention is to provide a device which incorporates an enclosure for a person which enables one to obtain a suntan during any season of the year regardless of the climatic conditions.

A further object of the present invention resides in the provision of a device of the type described which is motorized and contains means thereon for controlling the operation thereof so that the condensed beam of light from the reflector will be directed on the person reclining on the support as the sun travels across the sky.

Other features and objects of the invention will become apparent from the accompanying description and drawings in which:

FIGURE 3 is a side elvational view, partly in section, of the suntanning device of this invention.

FIGURE 4 is a sectional view taken along the line 4—4 in FIG. 3.

FIGURE 5 is a detailed view, partly in section, illustrating one of the light responsive cells employed on the device.

FIGURE 7 is a detail sectional view of the filter panel assembly.

FIGURE 8 is a graph illustrating the transmission characteristics of a pair of glass filters suitable for use in the device of this invention.

FIGURE 9 is a graph showing the energy transmitted by a filter suitable for use with the invention as compared with the energy of solar radiation.

Figure 1:
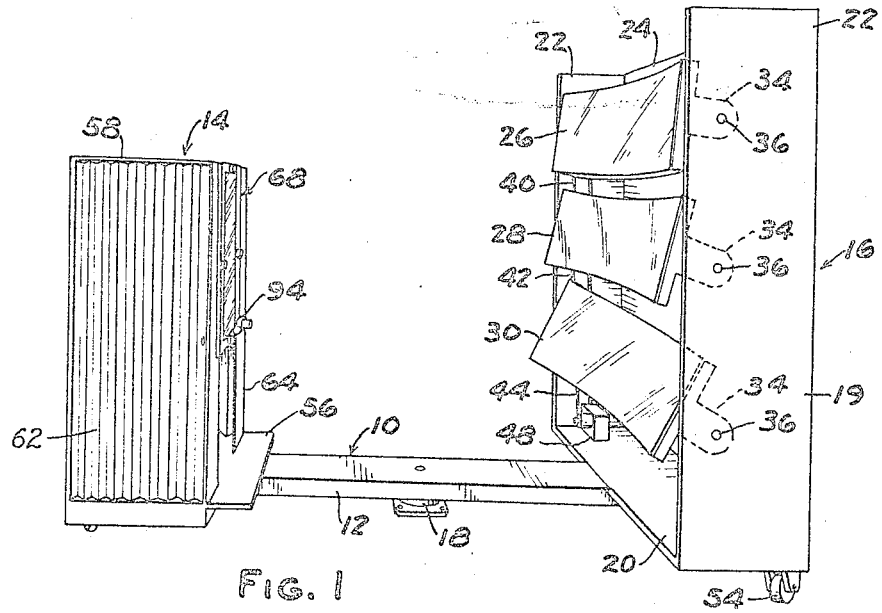
FIGURE 1 is a perspective view of one form of suntanning device constructed in accordance with the present invention.

Referring to the drawings, numeral 10 designates a main support in the form of a beam 12 supporting an enclosure 14 at one end and a reflector assembly 16 at its opposite end. Support 10 is mounted on a central pivot base 18 for rotation in a horizontal plane. Pivot base 18 is adapted to be supported on an out-of-doors ground or floor surface.

Reflector assembly 16 includes a housing 19 having a bottom wall 20, a pair of side walls 22 and a rear wall 24. The housing is securely mounted on one end of beam 12. A series of three reflectors 26, 28, and 30 are mounted on the side walls 22 of housing 19. Each reflector preferably comprises an elongated sheet of aluminum or other highly reflective material bend lengthwise into a concave shape and supported in this configuration by a suitable frame 32. At its opposite ends each frame is provided with a rearwardly extending arm 34 pivotally supported on the side walls 22 by means of stub shafts 36. The stub shafts 36 at one end of each reflector 26, 28 and 30 are provided with one or more sprockets 38 fixed thereon which are interconnected by chains 40, 42. Thus, the sprockets associated with the stub shafts on the uppermost and the intermediate reflectors are connected by the endless chain 40 and the sprockets associated with the stub shafts on the lowermost and intermediate reflectors are interconnected by chain 42. One sprocket on stub shaft 36 of the lowermost reflector 30 is interconnected by a chain 44 with a drive sprocket 46 supported on the bottom wall 20 of housing 19 and driven by a motor 48 through a suitable reduction gear, not specifically illustrated. A second motor 50 mounted on the bottom wall 20 of housing 19 is adapted to drive a ground-engaging wheel 52 supported on the underside of housing 19. The power driven ground-engaging wheel 52 is preferably located along the central axis of beam 12. Two additional ground-engaging wheels 54 are preferably provided on the underside of housing 19 at the opposite ends thereof. Wheels 54 can be in the form of swivelled casters or may be fixedly mounted on the housing so that their axes of rotation pass through the vertical axis of rotation of beam 12 about the pivot base 18.

Enclosure 14 includes a bottom wall 56, a top wall 58 and a rear wall 60. Each side of enclosure 14 is preferably closed by a foldable panel 62 which may be in the form of an accordion-type door. The front side of enclosure 14 comprises a pair of spaced apart upright panels 64, one at each side of the enclosure. Along their inner upright edges, panels 64 are provided with vertically extending tracks 66 for slidably retaining a filter panel assembly 68. In the arrangement illustrated, filter panel assembly 68 comprises a rectangular frame 70 engaged in the two tracks 66 and surrounding one or more glass filter panels 72.

Figure 6:
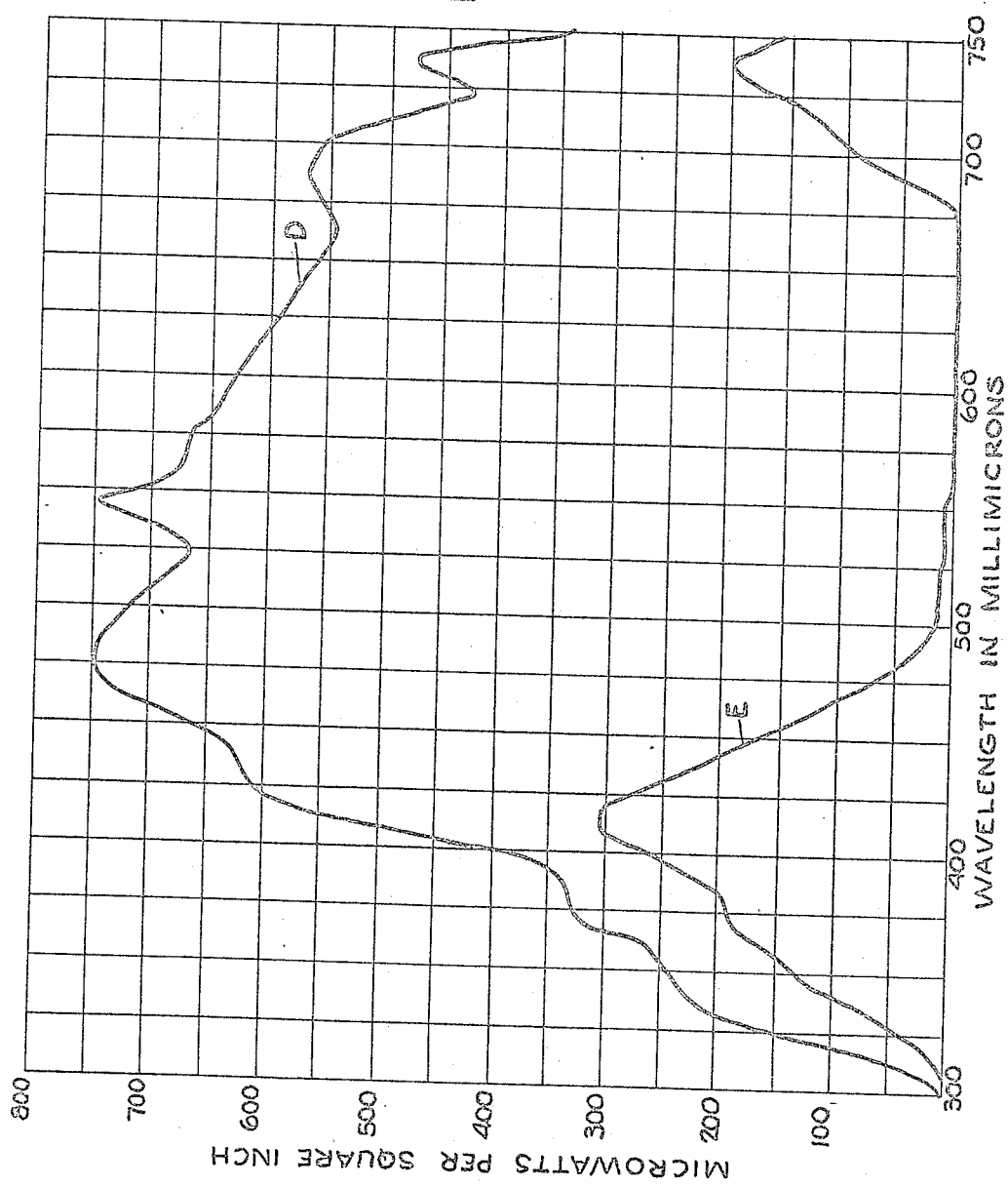
FIGURE 6 is a view similar to FIG. 3 on a reduced scale and showing adjustment of the device for tanning the lower part of a person's body.

Enclosure 14 has a height sufficient to accommodate a person standing or in a slightly reclined position as illustrated in FIG. 3. Because glass filters of the type required for the present invention are relatively expensive, the filter panel assembly 68 illustrated has a height slightly greater than half the height of enclosure 14 and is adapted to be shifted in tracks 66 from an uppermost position, illustrated in FIGS. 1, 3, and 4, to a lowered position, illustrated in FIG. 6. If desired, filter panel assembly 68 can be the full height of enclosure 14 so as to enable a person to expose his full height at one time to the suntanning radiation produced by the device. In the arrangement illustrated, panel assembly 68 is adapted to be shifted to the upper position for tanning the upper half of a person's body and shifted to the lower position, illustrated in FIG. 6, for tanning the lower half of a person's body.

Within enclosure 14 there is preferably provided an adjustable body support panel 74 against which a person may recline while sunbathing. On the underside of enclosure 14 a pair of ground-engaging wheels 76 are mounted. Enclosure 14 may be provided with suitable heating or ventilating means, if desired.

Figure 2:
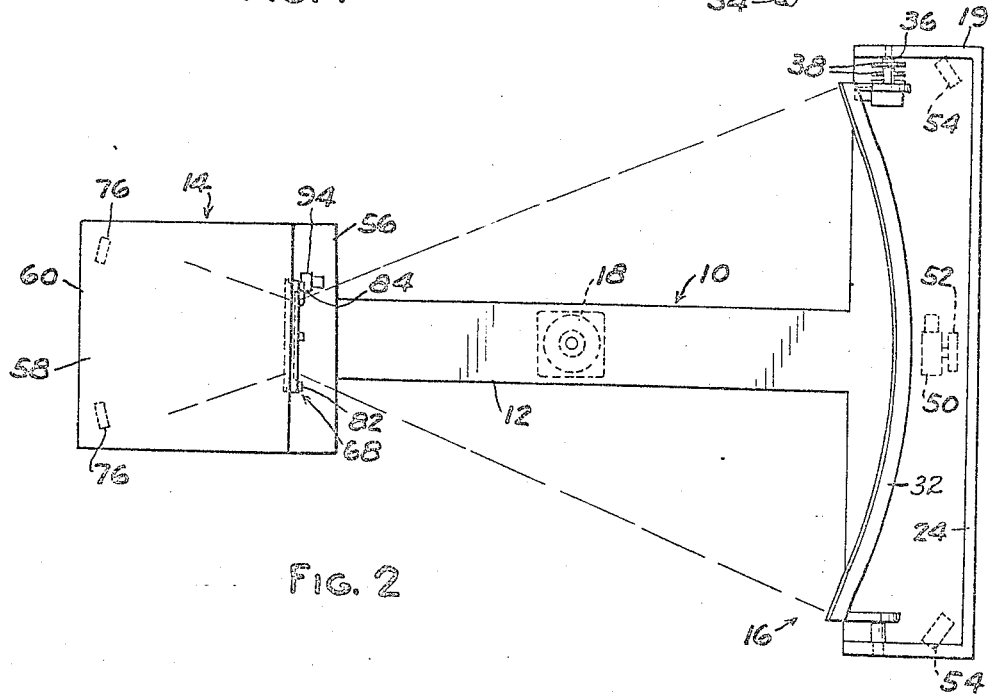
FIGURE 2 is a top plan view of the device shown in FIG. 1.

Referring to FIG. 3, each reflector 26, 28, and 30 is adjusted to cast an image of a condensed beam of sunlight through the glass filter panel 72. These reflectors are flat in vertical section and concave in horizontal section. Experience has shown that the beam reflected by the reflectors scatters somewhat in a vertical direction. Thus, the vertical dimension of filter 72 is preferably somewhat greater than the vertical dimension of each reflector. Referring to FIG. 2, each reflector has a concave configuration as viewed from above so that the light reflected therefrom produces a converging beam that casts its image on glass filter 72.

As an illustration of typical dimensions of a suitable form of device according to the present invention, the distance between the reflectors and the glass filter 72 may be about ten feet. The reflectors are 36" high and about ten feet long with a radius of curvature of about twenty feet. The glass filter 72 is about 7" wide and about 42" high. With this arrangement the full height and width of a person may be exposed to the suntanning radiation with the two positions of the filter assembly 68 shown in FIGS. 3 and 6, respectively. It will be noted that for maximum effectiveness of the device the relative inclination of reflectors 26, 28 and 30 is such that the images from the reflectors converge approximately at the plane of the person in enclosure 14 rather than at the plane of glass filter 72.

If desired, suitable switches may be provided within or on housing 19 which are accessible to the person sunbathing for operating motors 48 and 50. Each of these motors are of the reversible type. Motor 50, when energized, causes rotation of the main support 10 and the structure thereon in a horizontal plane about the axis of pivot base 18. This enables the device to be oriented in relation to the direction of the sun's rays such that the sun's rays will be reflected upon the glass filter 72. On the other hand, motor 48, when energized, controls the tilting action of reflectors 26, 28 and 30 about their horizontal axis and thus enables the sun's rays, as viewed in FIG. 3, to be reflected by the reflectors out to the glass filter 72. The inclination of the reflectors, as controlled by motor 48, will depend upon how high the sun is in the sky and whether the filter assembly 68 is adjusted to its raised or to its lowered position.

Motors 48 and 50 can be operated by means of manually actuated switches or they can be automatically operated, if desired. The means illustrated for automatically operating these motors comprises a series of four light responsive cells. One of such cells, designated 78, is positioned along the upper edge of filter assembly 68. Another such cell 80 is located adjacent the lower edge of filter assembly 68. Light cell 82 and 84 are located one adjacent each side of the filter assembly 68. Light cells 78, 80 are interconnected with motor 48 and with a source of power such that, if the high intensity light beam from the reflectors impinges against light cell 78, motor 48 is energized to shift the condensed light beam downwardly; and, if the high intensity beam impinges on light cell 80, motor 48 is energized to tilt the condensed light beam upwardly. Likewise, light cells 82, 84 are interconnected with motor 50 such that, if the condensed light beam impinges upon light cell 82, the main support 10 will be rotated in a counter-clockwise direction as viewed in FIG. 2; and, if the condensed light beam from the reflectors impinges upon light cell 82, the main support 10 will be rotated in a clockwise direction. Thus, with the automatic control arrangement illustrated and described, the device as a whole will rotate as required and the reflectors will tilt as required as the sun travels across the sky so that the image reflected from the reflectors is always cast upon the glass filter 72. In this connection it will be appreciated that reflectors 26, 28, and 30 are automatically tilted to the required inclination when filter assembly 68 is adjusted between the raised and lowered positions.

In view of the fact that the concentrated beams of light from reflectors 26, 28 and 30 are of relatively high intensity, it is desirable and, in some instances, necessary to cool the glass in filter panel assembly 68. Accordingly, the glass filter 72 may comprise two panels 72a and 72b which are retained in frame 70 in spaced apart relation by a peripheral spacer or gasket 86. The space between the two glass filters 72a, 72b defines a passageway 88 which at the lower end thereof communicates with an inlet port 90. An electric motor blower 94 mounted at the lower end of frame 70 is connected. The upper end of filter panel assembly 68 is provided with exhaust openings, not shown, for permitting the air flowing upwardly in passageway 88 to exhaust from between panels 72a and 72b and thus cool the glass filter. While a specific arrangement for cooling the glass in filter panel assembly 68 is illustrated, any other suitable cooling arrangement may obviously be utilized. For example, the hereinafter described filter solutions may be recirculated between panels 72a, 72b as a coolant. In this case blower 94 would be replaced with a liquid recirculating pump and a heat exchanger.

As pointed out previously, the most effective radiation for suntanning without burning has a wave length between about 320 and 440 millimicrons. Ideally the glass filter 72 in filter panel assembly 68 should be such as to absorb substantially completely all radiation having a wave length less than 320 millimicrons and greater than 440 millimicrons. As a practical matter, filters having this particular selective range of absorption are at present commercially unavailable. Filterse are readily available which absorb a very high percentage of radiant energy having a wave length less than about 310 millimicrons and between about 500 and 675 millimicrons. Likewise, filters are commercially available which transmit a high percentage of radiant energy having a wave length under about 675 millimicrons and which absorb a relatively high percentage of radiant energy above about 675 to 700 millimicrons. Thus, as a practical matter, with the filters now commercially available the selective absorption required of the filter glass 72 may be effectively obtained by using two or more filters which in combination have the charateristic of transmitting substantially high percentage of radiant energy having a wave length in the range of about 310 to 440 millimicrons and absorbing a high percentage of the radiant energy having a wave length above and below this range.

In FIG. 8 there is illustrated a series of curves showing the relative percentage of transmission of two filters suitable for use with the present invention. Curve A shows the approximate transmission characteristics for various wave lengths of a filter designated No. 5331 by Corning Glass Works. As shown by curve A, this filter absorbs a high percentage of radiant energy having a wave length below about 300 millimicrons and between about 500 and 675 millimicrons. It transmits a very high percentage of the radiant energy having a wave length between about 310 and 425 millimicrons and also transmits a relatively high percentage of the radiant energy having a wave length above about 700 millimicrons. This particular filter is therefore effective for absorbing sunburning radiaton but has a tendency to transmit radiation in the infrared range which produces heat.

Curve B in FIG. 8 depicts the transmission values of a second filter designated No. 2043 by Pittsburgh Plate Glass Co. which has the ability to absorb a high percentage of radiant heat having a wave length above about 700 millimicrons in the infrared region. When these two filters are combined into a filter panel assembly, the resulting transmission values of the combined filters is approximately that represented by curve C in FIG. 8. Curve C also takes into account the reflective characteristics of polished aluminum reflectors which, of course, are not 100% efficient at all wave lengths. It will be observed by referring to curve C in FIG. 8 that the combination of filters represented by curves A and B produces a result which is very desirable from the standpoint of the present invention in that this combination of the filters transmits a relatively high percentage of radiation having a wave length between about 310 and 425 millimicrons and at the same time absorbs a high percentage of radiation having a wave length below 310 millimicrons and above 500 millimicrons.

In FIG. 9 the curve designated D is typical of the energy reaching the earth's surface from solar radiation. Curve E in FIG. 9 shows the approximate energy from solar radiation that is transmitted by the combination of glass filters corresponding generally to the filters depicted by the curves A and B in FIG. 8. Curve E in FIG. 9, however, does not take into account the intensification of the radiation transmitted by the glass filters resulting from the use of reflectors 26, 28 and 30. The actual effective radiation produced by the filters as intensified by the reflectors is illustrated by curve F in FIG. 10. As a basis of comparison, FIG. 10 also shows the energy of solar radiation reaching the earth's surface which is designated by curve G.

Figure 10:
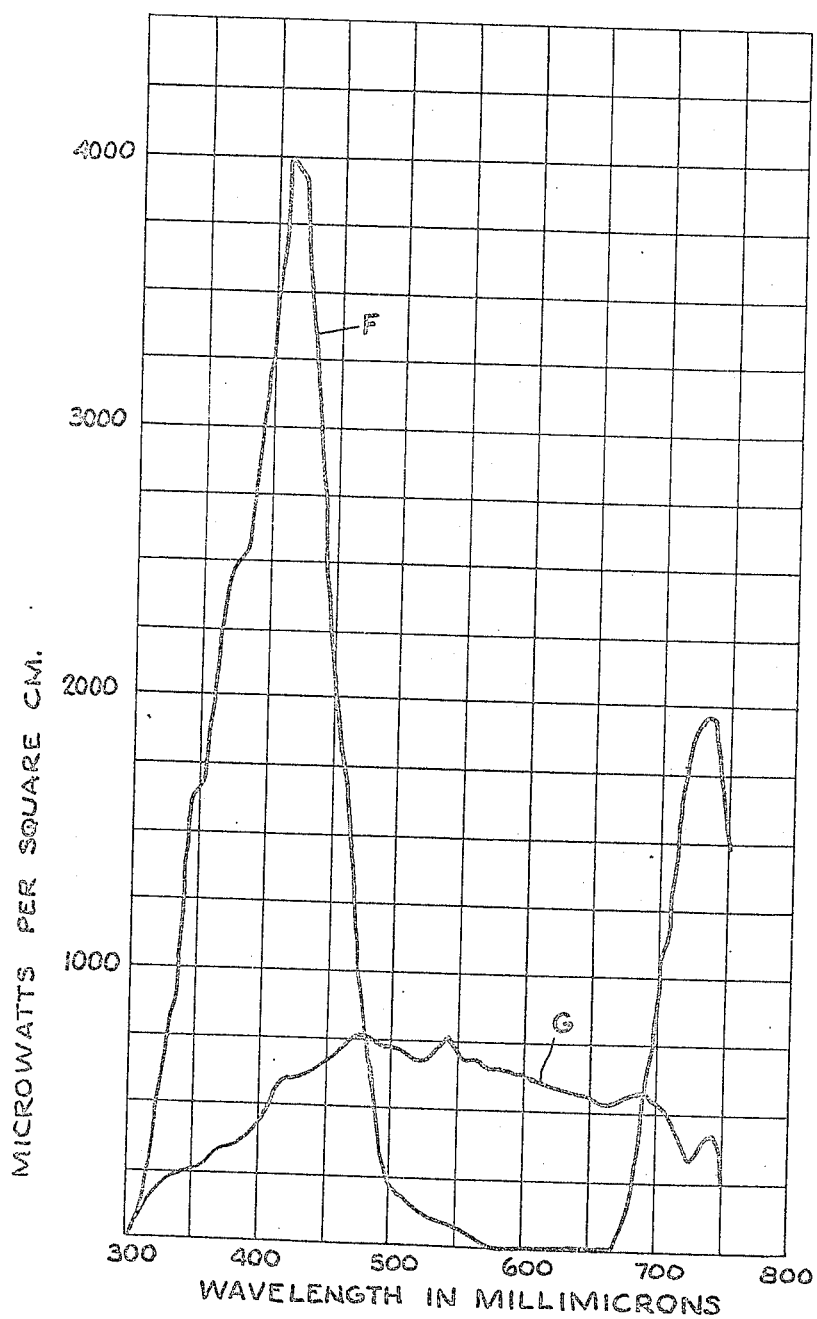
FIGURE 10 is a graph illustrating the relative intensity of solar radiation and the radiation produced by the suntanning device of the present invention.

It will be apparent from comparison of curves F and G in FIG. 10 that the combination of the reflectors and the glass filters described above is very effective for producing tanning of the skin at an accelerated rate with substantially no sunburning. This results from the fact that, although the reflectors intensify the radiation substantially, the glass filters themselves transmit a high percentage of the radiant energy having a wave length between about 310 and 440 millimicrons and substantially completely absorbs all radiation having a wave length of less than about 310 millimicrons. The radiant heat transmitted by the filters in the higher wave lengths is not sufficiently high as to be objectionable or uncomfortable to the skin.

Additional filters or other filters, as described hereinafter, may be used to vary the transmission values of the filter assembly as desired. For example with persons whose skin is very sensitive to sunburn, caution might dictate the use of a filter assembly capable of absorbing substantially all radiation below 330 instead of 310 millimicrons.

The invention is not limited strictly to the use of glass filters. In the place of glass filters or in combination therewith chemical solutions may be used as the filter means. It has been determined, for example, that various chemical solutions, particularly aqueous solutions of inorganic salts, provide an excellent filtering medium for particular wave lengths in the solar spectrum. Aqueous solutions of cupric sulfate ($CuSO_4 \cdot 5H_2O$) and/or cobaltous sulfate ($CoSO_4 \cdot 7H_2O$) can be advantageously used as the filtering mediums in the present invention. A cupric sulfate solution containing approximately 100 grams of cupric sulfate per liter of water exhibits excellent transmission and aborption characteristics in connection with the present invention. A filter comprising this solution in a layer having a thickness of about five centimeters has an excellent wave shape. It transmits to a very high degree radiation having a wave length between 310 and 440 millimicrons and absorbs substantially all radiant energy having a wave length below 300 millimicrons and above 600 millimicrons. The transmission characteristics of the solution can be varied by varying the concentration of the solution and the thickness of the solution layer. The transmission characteristics of the filter can also be varied by using a combination of different solutions. For example when a filter containing the above referred to cupric sulfate solution is combined with a cobaltous sulfate solution containing about 75 grams per liter of water, the high transmission values of the cupric sulfate solution in the range of about 325 to 425 millimicrons are not substantially reduced but the relatively high transmission values of cupric sulfate between about 425 and 550 millimicrons are reduced very substantially.

As pointed out above, where a chemical solution is used as a filter medium it may be recirculated between the glass panels 72a, 72b and through a heat exchanger to serve as a coolant. In such an arrangement the glass panels 72a, 72b may be either ordinary transparent glass panels or may be filter glass panels which in combination with the filter solution improves the transmission characteristics of the filter panel as a whole in relation to the selective wave lengths required for producing a suntan without burning. In the case of filtering solutions panels 72a, 72b may be formed of plastic if desired. Furthermore the use of filtering solutions, because they are reltively inexpensive, permits utilization of a filter panel assembly of full height of enclosure 19.

Thus it will be seen that the suntanning device of the present invention is admirably suited for enabling a person to obtain a suntan at a highly accelerated rate while reducing the susceptibility of sunburning to a minimum. The accelerated rate at which the tanning is produced is achieved by the intensification of the solar energy produced by the reflectors. While the elimination of the sunburning effect is achieved by the use of the proper filter or filters, the selection of the proper filters also eliminates the intense heat normally present in sun light.

The use of an enclosure, such as illustrated at 14, is another important feature of the present invention. It affords protection from the elements in the cold weather and it also protects the user from direct radiation from the sun. The latter is undesirable not only from the standpoint of heat but also from the standpoint of protecting the user from solar radiation having a wave length that would normally produce sunburning. It will be apparent, of course, that, if desired, an auxillary transparent or opaque panel may be provided in addition to the filter panel assembly 68 for closing that portion of the front wall of enclosure 14 not occupied by filter panel assembly 68. Thus, if the filter panel assembly 68 is adjusted to the raised position illustrated in FIG. 4, an auxillary panel may be arranged in the lower half of the opening at the front of enclosure 14; and if the filler panel assembly 68 is adjusted to the lower position illustrated in FIG. 6, the auxillary panel may be arranged in the upper half of the opening. With such an arrangement the device of this invention can be used in cold weather to obtain a suntan as long as the sun is shining.

I claim:

1. A device for accelerating suntanning while reducing susceptibility of sunburning which comprises a main support mounted for rotation in a horizontal plane, reflector means adjustably mounted on said main support, said reflector means being adapted to receive rays of sunlight and concentrate them into a condensing beam of high intensity, a person support on said main support, filter means on said main support located between said reflector means and said person support such that a person on said person support is adapted to receive the filtered rays of the condensed high intensity beam, said filter means being adapted to selectively absorb a high percentage of light energy having a wave length in the sunburning rays and to transmit to a high degree light energy having a wave length in the suntanning range, power means for adjusting said reflector means and for rotating said main support and a plurality of light responsive devices positioned adjacent said filter means for actuating said power means when the condensed beam from the reflector means impinges upon said light responsive devices.

2. A device for accelerating suntanning while reducing the susceptibility of sunburning which comprises a main support mounted for rotation in a horizontal plane, a concave reflector for receiving rays of sunlight and concentrating them into a condensing beam of high intensity, said concave reflector being rotatably adjustable on said main support about a horizontal axis, said main support having means thereon adapted for supporting a person, filter means mounted on said main support between said reflector and said person support so that a person on said person support can be positioned to receive the filtered rays of condensed high intensity beam, said filter means being located in the path of said condensed beam and being spaced from said reflector in a plane wherein the condensing beam has a relatively small cross sectional area compared with the light receiving area of said reflector so that the light beam impinging upon the filter means is of substantially higher intensity than the light beam impinging upon said reflector, said filter means being adapted to absorb a high percentage of the light energy having a wave length under about 310 and above about 500 millimicrons and to transmit to a high degree energy having a wave length of between 310 and 440 millimicrons, power means for adjusting said reflector and for rotating said main support and a plurality of light responsive devices positioned adjacent said filter means for actuating said power means when the condensed beam from the reflector impinges upon said light responsive devices.

3. The combination called for in claim 2 wherein said power means includes motor means for adjusting said reflector and second motor means for rotating said main support, said light responsive devices being adapted to selectively actuate said first and second motor means.

4. The combination called for in claim 3 wherein said light responsive devices comprise at least four in number, one adjacent each side edge of the filter means and one adjacent the top and bottom edges of the filter means, the light responsive devices adjacent the side edges of the filter means being adapted to control the motor means for rotating the main support and the light responsive devices adjacent the upper and lower edges of the filter means being adapted to control the motor means for adjusting the reflector.

References Cited

UNITED STATES PATENTS

| | | | |
|---|---|---|---|
| 1,974,739 | 9/1934 | Fraps | 128—372 |
| 2,493,328 | 1/1950 | Wandyak | 128—372 |
| 2,675,807 | 4/1954 | Pursel | 128—372 |
| 3,174,398 | 3/1965 | Brauner | 350—312 XR |

FOREIGN PATENTS

| | | |
|---|---|---|
| 353,266 | 7/1931 | Great Britain. |
| 156,052 | 10/1932 | Switzerland. |

OTHER REFERENCES

Corning Glass Works, glass color filters, May 15, 1936, p. 11.

RICHARD A. GAUDET, Primary Examiner

MARTIN F. MAGESTIC, Assistant Examiner

PO-1050
(5/69)

UNITED STATES PATENT OFFICE
CERTIFICATE OF CORRECTION

Patent No. 3,483,871          Dated December 16, 1969

Inventor(s) Billy N. Wilson

It is certified that error appears in the above-identified patent and that said Letters Patent are hereby corrected as shown below:

Column 7, line 41   Cancel "rays" and insert -- range --

SIGNED AND
SEALED
MAY 12 1970

(SEAL)
Attest:

Edward M. Fletcher, Jr.
Attesting Officer

WILLIAM E. SCHUYLER, JR.
Commissioner of Patents